R. D. STREBY.
WHEEL CONSTRUCTION.
APPLICATION FILED JAN. 6, 1919.
1,344,600.
Patented June 22, 1920.
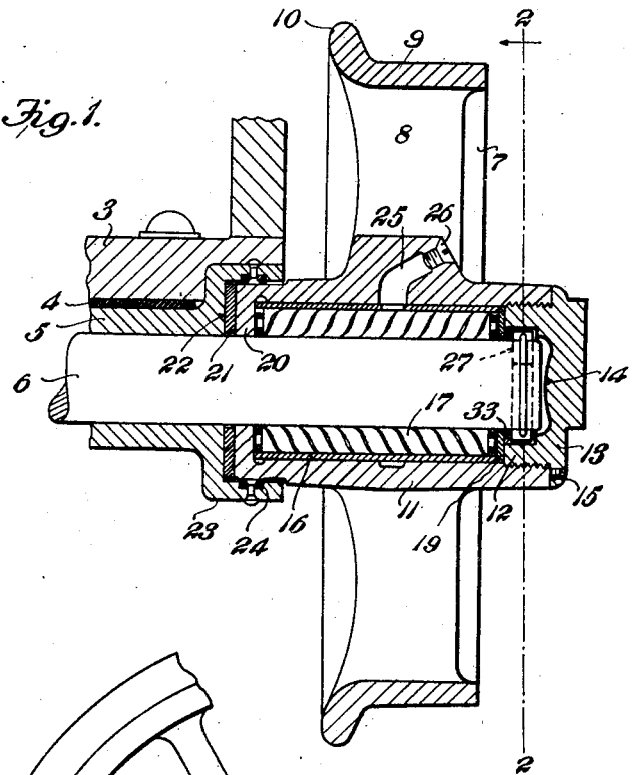
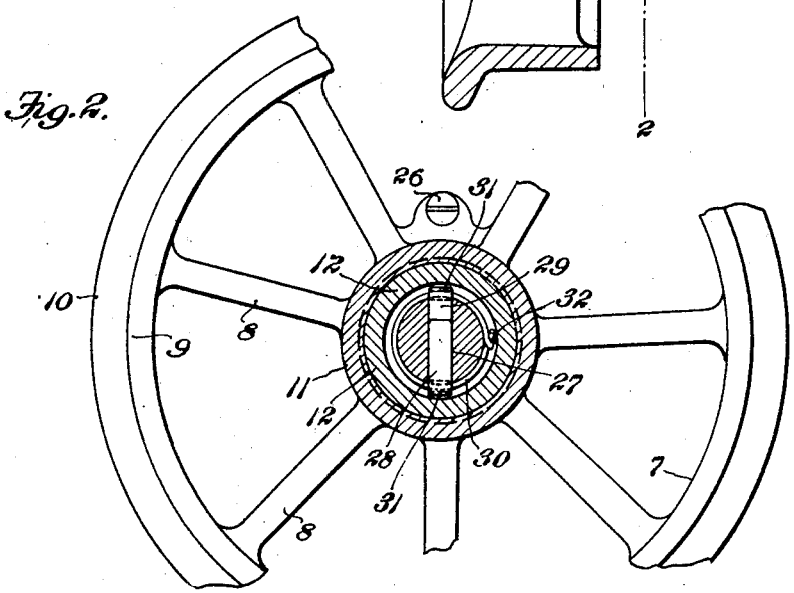
INVENTOR:
Ray D. Streby,
BY Frease, Merkel, Saywell and Boud
ATTORNEYS.

UNITED STATES PATENT OFFICE.

RAY D. STREBY, OF CANAL FULTON, OHIO, ASSIGNOR TO THE FULTON-KENOVA MINE CAR COMPANY, OF CLEVELAND, OHIO, A CORPORATION OF OHIO.

WHEEL CONSTRUCTION.

1,344,600.   Specification of Letters Patent.   Patented June 22, 1920.

Application filed January 6, 1919. Serial No. 269,798.

*To all whom it may concern:*

Be it known that I, RAY D. STREBY, a citizen of the United States, residing at Canal Fulton, in the county of Stark and State of Ohio, have invented a new and useful Wheel Construction, of which the following is a specification.

The present invention relates to car wheel construction and has more especial reference to the construction of wheels for mine cars and the like.

The object of the present invention is the provision of means by which a car wheel may be readily mounted upon or removed from the axle.

A further object is to provide a locker pin by means of which the car wheel may be easily attached to or detached from the axle.

A still further object is to provide a locker pin of the character referred to, of two sections with means for retaining said sections in position upon the axle.

Another object is the provision of a simple and inexpensive structure of the character referred to, which will be durable and effective.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the drawings:

Figure 1 is a longitudinal sectional view of a wheel constructed in accordance the present invention, showing a portion of the axle and of the car upon which said axle is mounted.

Fig. 2 is a sectional view taken on the line 2—2, Fig. 1.

Similar numerals of reference indicate corresponding parts throughout the several figures of the drawings.

Referring more especially to the construction illustrated in the accompanying drawings, the numeral 3 indicates a portion of the car body upon the lower side of which is mounted a channel iron 4 to which is connected in any suitable and well known manner the boxing 5, which forms a bearing for the axle 6. The wheel 7 is provided with the usual spokes 8 and rim 9, said rim being provided with the usual flange 10, the hub 11 of said wheel being internally screw threaded at its outer extremity to accommodate the screw threaded nipple 12 of the wheel cap 13, an internal convex surface 14 being provided upon said wheel cap as shown in the drawings. A set screw 15 is provided through the wheel cap for the purpose of preventing the cap from working loose due to the rotation of the wheel.

The construction shown in the drawings comprises a roller bearing, a steel lining 16 being provided to retain the rollers 17, which are carried in a cage 18. A wearing washer 19 is provided at the outer extremity of the roller bearing cage and engages the inner extremity of the screw threaded nipple 12. The annular flange 20 is provided at the inner extremity of the wheel hub for the purpose of holding the roller structure within the wheel, a wearing washer 21 being interposed between said flange and the face 22 of the boxing.

The boxing 5 is provided with the annular flange 23, which is located around the hub and contains a ring 24 of felt or similar material adapted to prevent lubricating grease or oil from working out between the hub and the flange 23. An oil or grease aperture 25 is located through the hub for the purpose of lubricating the roller bearing and is provided with a screw threaded plug 26.

The axle is provided, near its outer extremity, with a diametrically disposed aperture 27, adapted to receive the long and short sections 28 and 29, respectively, of the locker pin, said sections being held in place within the aperture 27, by means of the wire 30, which is passed through suitable apertures 31 formed in the locker pin, said wire being passed around the axle and the ends thereof fastened together as shown at 32.

In assembling the wheel upon the axle, the longer section 28 of the locker pin, which is slightly shorter than the diameter of the axle, is placed through the aperture 27 and the wheel is placed in position upon the axle. The steel washer 33 may then be placed in position and the short section 29 of the locker pin inserted in the upper end of the aperture 27, the wire 30 then being placed around the axle and through the aperture 31 of the locker pin sections, the ends of the wire being fastened together as shown at 32. The wheel cap 13 is then attached and held securely in place by the set screw 15, and the wheel is held in the proper position upon the axle.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:—

1. In a structure of the character described, an axle, a boxing, a wheel having a hub surrounding said axle and bearing against said boxing and a locker pin formed of two separable sections located entirely through said axle.

2. In a structure of the character described, an axle, a wheel having a hub surrounding said axle and a locker pin formed of two separable sections located entirely through said axle.

3. In a structure of the character described, an axle, a wheel having a hub surrounding said axle and a locker pin formed of two separable sections located entirely through said axle, one of said sections being longer than the other section.

4. In a structure of the character described, an axle, a wheel having a hub surrounding said axle and a locker pin formed of two separable sections located entirely through said axle, one of said sections being slightly less in length than the diameter of the axle.

5. In a structure of the character described, an axle, a wheel having a hub surrounding said axle, a locker pin formed of two separable sections located entirely through said axle and means for retaining said sections in position through the axle.

6. In a structure of the character described, an axle, a wheel having a hub surrounding said axle, a locker pin formed of two sections located through said axle and a ring located around said axle and retaining said sections in position.

7. In a structure of the character described, an axle, a wheel having a hub surrounding said axle, a locker pin formed of two sections located through said axle and a cap connected to said hub and provided with a shoulder arranged to engage said pin.

8. In a structure of the character described, an axle, a wheel having a hub surrounding said axle, a locker pin formed of two sections located through said axle and a cap carried by said hub and provided with an annular groove arranged to engage said pin.

9. In a structure of the character described, an axle, a wheel having a hub surrounding the axle, a locker pin formed of two sections located through said axle and a screw threaded cap carried by said axle and provided with an annular groove arranged to rotate around the ends of the pin.

10. In a structure of the character described, an axle, a wheel having a hub surrounding said axle and a locker pin formed of two sections located through said axle, and a hub cap provided with an annular groove to receive the ends of said pin.

In testimony that I claim the above, I have hereunto subscribed my name.

RAY D. STREBY.